Patented June 23, 1931

1,811,667

UNITED STATES PATENT OFFICE

JAMES H. GRAVELL, OF ELKINS PARK, PENNSYLVANIA, ASSIGNOR TO AMERICAN CHEMICAL PAINT COMPANY, OF AMBLER, PENNSYLVANIA, A CORPORATION OF DELAWARE

FLUX FOR SOLDERING

No Drawing. Application filed February 4, 1930. Serial No. 425,823.

This invention relates to the art of fluxing and is directed to improvements in fluxes for soldering.

The objects of this invention are: to provide a flux which is less corrosive; more easily confined to the spot to be soldered; has longer life; fluxes better; operates at lower temperatures and is less expensive than the fluxes of the prior art.

Although my flux may be used generally, it is especially useful for soft soldering on sheet steel where the flux is applied locally to the spot to be soldered and a lead-tin alloy is applied in the molten state by means of a "soldering iron" or wooden paddle.

I have found that a dry admixture comprising zinc chloride and aniline hydrochloride produces a flux of improved properties. Such a flux, however, is cumbersome in application compared to a liquid flux which may be applied with a brush or swab. It therefore may be desirable to dissolve my admixture in water and apply it as a solution. Such a solution ionizes the ingredients and the halogen thus liberated is apt to cause excessive rusting. This rusting can be greatly mitigated by replacing the water by another vehicle which will not ionize the ingredients. In case a vehicle is selected like petrolatum in which the ingredients are not soluble, I find that simply mixing the powdered ingredients with the vehicle produces satisfactory results. This mechanical mixing may be simplified by first dissolving one or more of the ingredients in a suitable solvent, thus producing a more uniform distribution of one or both ingredients. Such a solvent as butyl alcohol may be used simply as the solvent or as a combined solvent and vehicle.

The zinc chloride in my admixture may be replaced by lithium chloride, or stannous chloride or zinc bromide, or in fact by any haloid which is a stable liquid at the temperature required for soldering, e. g. from 350° F. to 450° centigrade, and the aniline hydrochloride may be replaced by any haloid which is a volatile liquid at the temperature required for soldering.

Generally stated, my invention is a flux for soldering which consists of an admixture comprising zinc chloride and aniline hydrochloride and it also includes admixtures of these haloids or other haloids of similar properties with non-ionizing vehicles and further it includes any of these admixtures which includes solvents for one or more of the haloids in the said admixtures.

To manufacture my flux, I may use:

|  | Pounds |
|---|---|
| Zinc chloride | 17.50 |
| Aniline hydrochloride | 13.13 |

These ingredients may be reduced to powders and then mixed, or the two ingredients may be ground together, or the zinc chloride may be dissolved in a solvent such as butyl alcohol and the aniline hydrochloride in powdered form admixed with this solution to form a paste. If desired, a vehicle like stearic acid, palmic acid, starch paste, or petrolatum may be added in order to more easily manipulate the application of the flux and reduce the corrosive effect of the haloids.

A very satisfactory soldering flux in paste form may be made by using:

| | |
|---|---|
| Zinc chloride | 17.50 pounds |
| Butyl alcohol | 1.29 gallons |
| Aniline hydrochloride | 13.13 pounds |
| Petrolatum | 6.69 gallons |

The aniline hydrochloride should be ground to pass a 60 mesh sieve and then thoroughly mixed with the petrolatum in a kneading machine. The zinc chloride should be dissolved in the butyl alcohol by the aid of a gentle heat and then added to the admixture of the aniline hydrochloride and the petrolatum and the whole then thoroughly stirred to form a uniform admixture.

My flux is used in the usual way. The metal to be soldered is treated with the flux and the solder then melted to the metal. The heat which melts the solder also causes one of the haloids in the flux to melt to a stable liquid and causes the other haloid to melt and volatilize and liberate the halogen which attacks the solder and the metal being soldered, forming salts of these metals which are dissolved by the stable haloid, thus cleaning the metal and permitting it to alloy with the solder.

I claim:

A flux for soldering, being an admixture comprising zinc chloride, butyl alcohol, aniline hydrochloride, and petrolatum.

JAMES H. GRAVELL.